Jan. 13, 1959  R. C. HORTON ET AL  2,867,891
PROCESS FOR MANUFACTURE OF COATED FILAMENTARY MATERIAL
Filed March 11, 1954  6 Sheets-Sheet 1

INVENTORS.
Richard C. Horton
William H. Miller
BY William Kenneth Lydic
ATTORNEYS Jan. 13, 1959 R. C. HORTON ET AL 2,867,891
PROCESS FOR MANUFACTURE OF COATED FILAMENTARY MATERIAL
Filed March 11, 1954 6 Sheets-Sheet 2

INVENTORS
Richard C. Horton
William H. Miller
BY William Kenneth Lydic

ATTORNEYS

Jan. 13, 1959  R. C. HORTON ET AL  2,867,891
PROCESS FOR MANUFACTURE OF COATED FILAMENTARY MATERIAL
Filed March 11, 1954  6 Sheets-Sheet 3
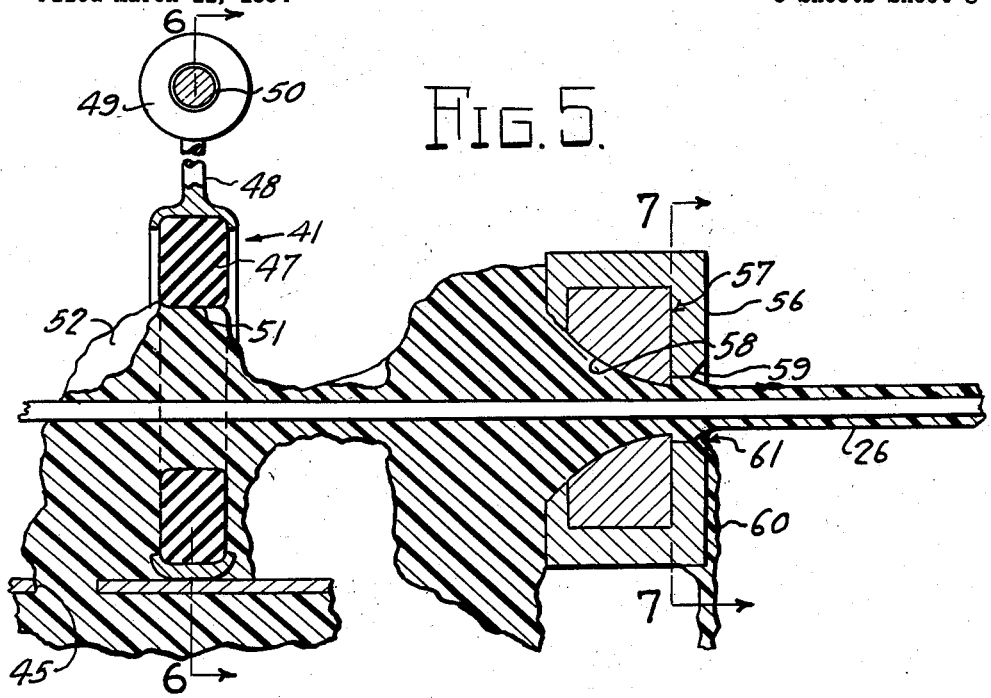
FIG. 5.
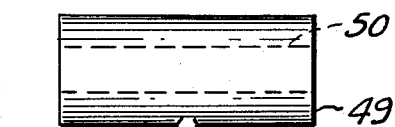
FIG. 7.
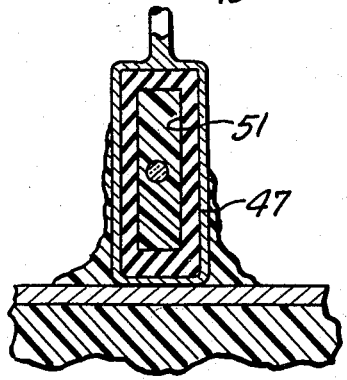
FIG. 6.
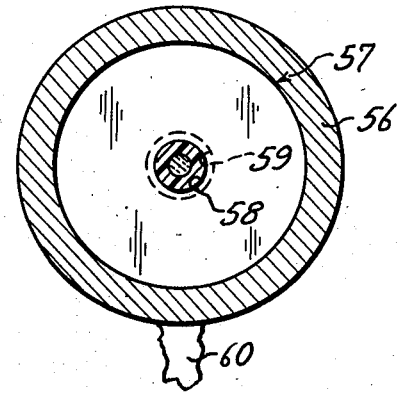
INVENTORS.
Richard C. Horton
William H. Miller
BY William Kenneth Lydic
ATTORNEYS Jan. 13, 1959  R. C. HORTON ET AL  2,867,891
PROCESS FOR MANUFACTURE OF COATED FILAMENTARY MATERIAL
Filed March 11, 1954  6 Sheets-Sheet 4
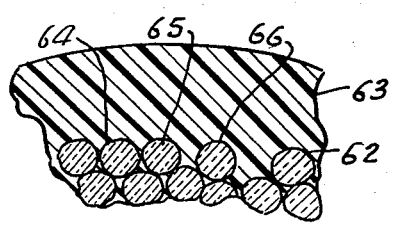
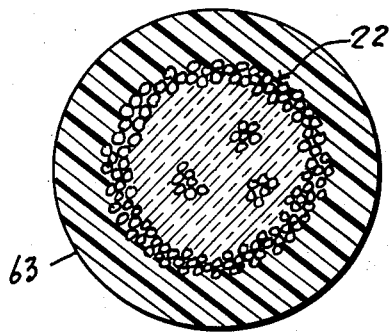
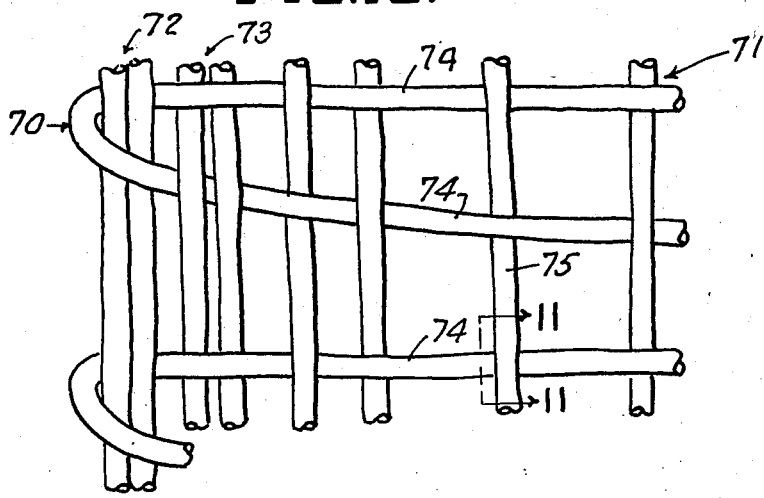
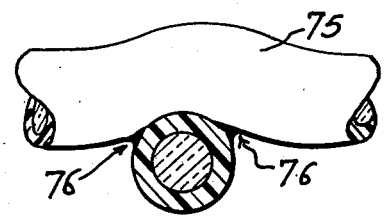
INVENTORS
Richard C. Horton
William H. Miller
William Kenneth Lydic
BY
ATTORNEYS

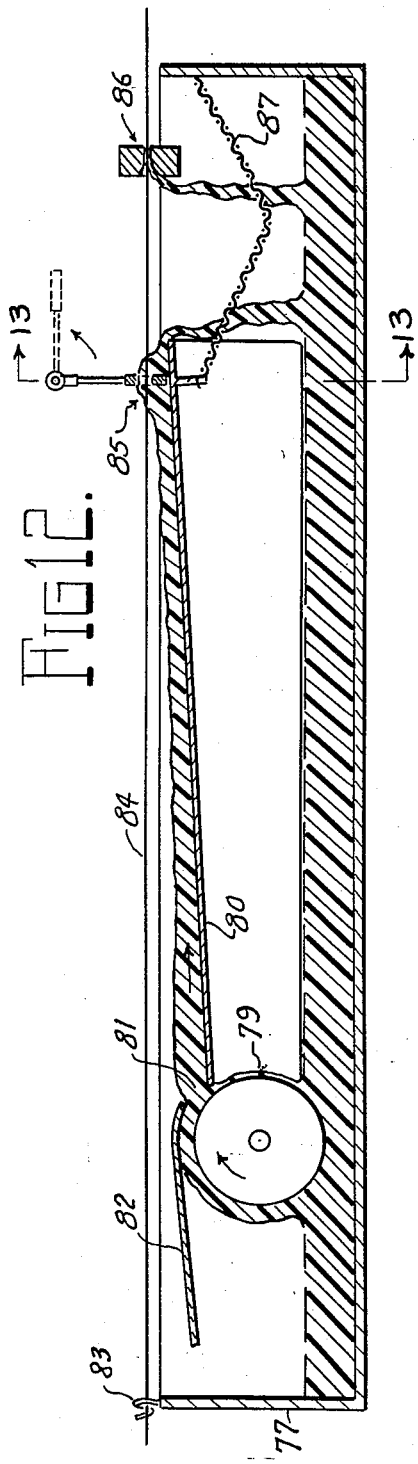
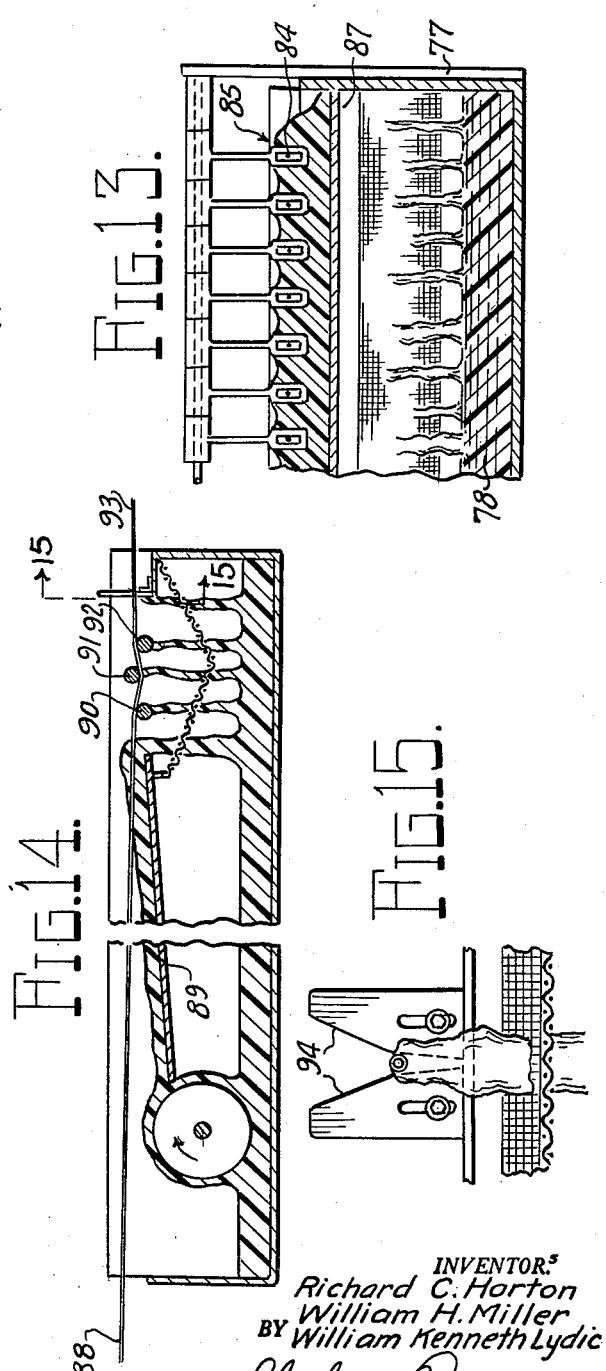

Jan. 13, 1959  R. C. HORTON ET AL  2,867,891
PROCESS FOR MANUFACTURE OF COATED FILAMENTARY MATERIAL
Filed March 11, 1954  6 Sheets-Sheet 6
FIG.16.
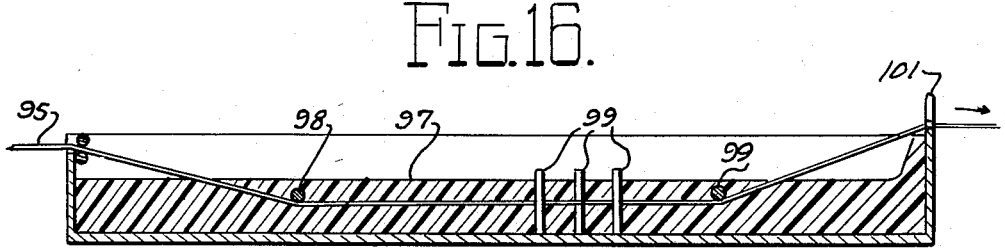
FIG.17.
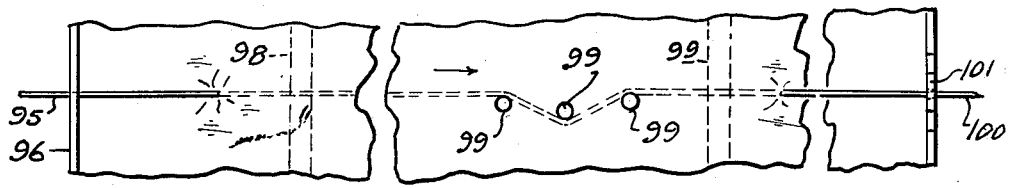
FIG.18.
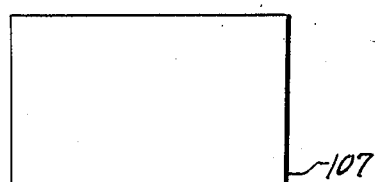
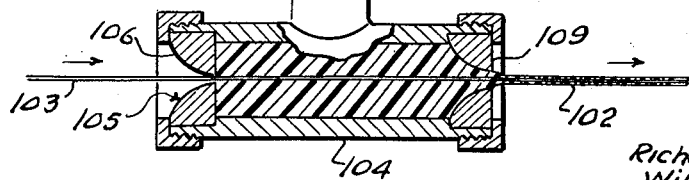
INVENTORS
Richard C. Horton
William H. Miller
BY William Kenneth Lydic
ATTORNEYS

United States Patent Office 2,867,891
Patented Jan. 13, 1959

2,867,891

PROCESS FOR MANUFACTURE OF COATED FILAMENTARY MATERIAL

Richard C. Horton and William H. Miller, Pawtucket, R. I., and William Kenneth Lydic, Attleboro, Mass., assignors to Owens-Corning Fiberglas Corporation, a corporation of Delaware Application March 11, 1954, Serial No. 415,584

1 Claim. (Cl. 28—73)

This invention relates to a process for the continuous production of a filamentary material consisting of glass fibers and flexible synthetic resin and to the filamentary material itself which is particularly suitable for end uses requiring high tensile strength, resistance to abrasion, corrosion and electricity, resistance to mildew, rot, insects and staining and has adaptability for direct substitution in existing machinery for the fabrication of end products.

Many filamentary materials have been produced for purposes as diversified as the weaving of insect screen, the weaving of cloth both for textile uses and for industrial uses, the wrapping of joints and other connections wherein the objectives have been the obtaining of the desirable qualities outlined above. In many of these applications a considerable tensile strength is necessary in order to withstand strains to which the material is subjected in use or fabrication and yet it is necessary that the filamentary material be of relatively small diameter and light weight.

These characteristics are all obtainable from glass fibers and from strands of glass fiber but glass alone is subject to abrasive destruction, to fraying, and does not adapt itself for handling in machinery designed to handle other filamentary materials such as metal wire or plastic filaments such as nylon, rayon or "Saran" (Dow Chemical Company's brand of polyvinylidene chloride).

As an example of the type of end product in the fabrication of which the filamentary material of the invention is adapted for use, insect screening may be chosen since it illustrates both in its fabrication and in its use many of the problems overcome by the material of the instant invention. Insect screens woven from iron wire are the oldest type still commercially available but have numbers of objections, particularly the staining of surrounding portions of the building caused by rusting of the wire and the dull, unattractive color of the screen even when galvanized or painted to afford some protection from weathering. While metal screens have substantial strength they are subject to "sagging" as, for example, from the repeated thrust of an elbow to stop a swinging screen door, and they are quite heavy when handled in quantity. Some of these objections have been overcome by the fabrication of insect screening from aluminum and copper wire. Again, however, the color range of the material is limited and, because of its malleability, the screens develop sag quite readily.

More recently insect screening fabricated from an all resin filament, specifically polyvinylidene chloride sold commercially under the trade mark "Saran," has been commercialized. This screening is available in different colors, the material is resilient so that it does not sag to an extent as great as that of the metal screens and it is lighter in weight. Such a resinous material however is not fireproof. Experience has shown that many persons, particularly in hotels and public lodging establishments, are prone to extinguish the ends of lighted cigarettes against a screen. Of course, this results in a hole in a plastic screen and requires a substantial repair operation.

Similar filaments or wire-like materials, particularly the textile types of filaments as, for example, rayon, nylon and the aforementioned "Saran," have been woven into heavy fabric-like sheets and employed in the manufacture of automobile seat covers where their smooth surfaces allow the passenger to slide easily off and onto the seat. Again, however, the flammability, or at least the melting of the substance is a serious drawback.

It is the principal object of this invention to provide a filamentary material incorporating a high tensile strength for its size and weight, with resistance to weathering, abrasion and other destructive forces and yet which can be made in any color, and which can be handled by existing machinery and is fireproof.

Another object of this instant invention is to provide a process for the continuous, rapid production of a filamentary material having the qualities outlined and comprising a combination of glass fibers or glass fiber strands with a suitable resin, for example, vinyl chloride.

A more specific object of the invention is the provision of a filamentary material consisting of one or more strands of glass fibers and an equal weight of a tightly bonded outer layer of selectively colored resin.

A still further object of the invention is the provision of a filamentary material having a high tensile strength, resistance to weathering, mildew and insects which is substantially fireproof and which can be utilized in conventional wire screen weaving machinery designed for handling metallic wires without substantial redesign.

Yet another object of the invention is the provision of a filamentary material particularly applicable to the weaving of insect screening and the screening produced therefrom.

These and other and more specific objects of the invention will be better understood from the specification which follows and from the drawings in which:

Fig. 5 is a greatly enlarged vertical sectional view through the filament forming elements of the apparatus disclosed in Figs. 3 and 4.

Fig. 6 is a fragmentary vertical sectional view taken along the line 6—6 of Fig. 5.

Fig. 7 is a vertical sectional view taken along the line 7—7 of Fig. 5.

Fig. 8 is across section of filamentary material produced upon apparatus operated according to the process and constituting an embodiment of the invention, the figure being taken along the line 8—8 of Fig. 5, on a greatly enlarged scale.

Fig. 9 is a fragmentary sectional view of a portion of the section shown in Fig. 8, on a still further enlarged scale.

Fig. 10 is an enlarged fragmentary view in elevation of a small section of a woven insect screening fabricated from a filamentary material embodying the invention.

Fig. 11 is a fragmentary still further enlarged view taken along the line 11—11 of Fig. 10.

Fig. 12 is a simplified vertical sectional view of a different apparatus for the fabrication of a glass fiber and resin filament according to the invention.

Fig. 13 is a fragmentary vertical sectional view taken along the line 13—13 of Fig. 12.

Fig. 14 is a view similar to Fig. 12 but of a modified form of apparatus suitable for operation according to a modification of the process embodying the invention for the production of a filamentary material of the invention.

Fig. 15 is a fragmentary, enlarged vertical sectional view taken from the position indicated by the line 15—15 of Fig. 14.

Fig. 16 is a view somewhat similar to Figs. 12 and 14 but of further modified apparatus also designed for carrying out the process of the invention.

Fig. 17 is an enlarged fragmentary plan view of the apparatus shown in Fig. 16.

Fig. 18 is a view partly in elevation and partly in section of a greatly simplified apparatus upon which the process of the invention can be carried out for the production of a single filament embodying the invention.

Figure 1:
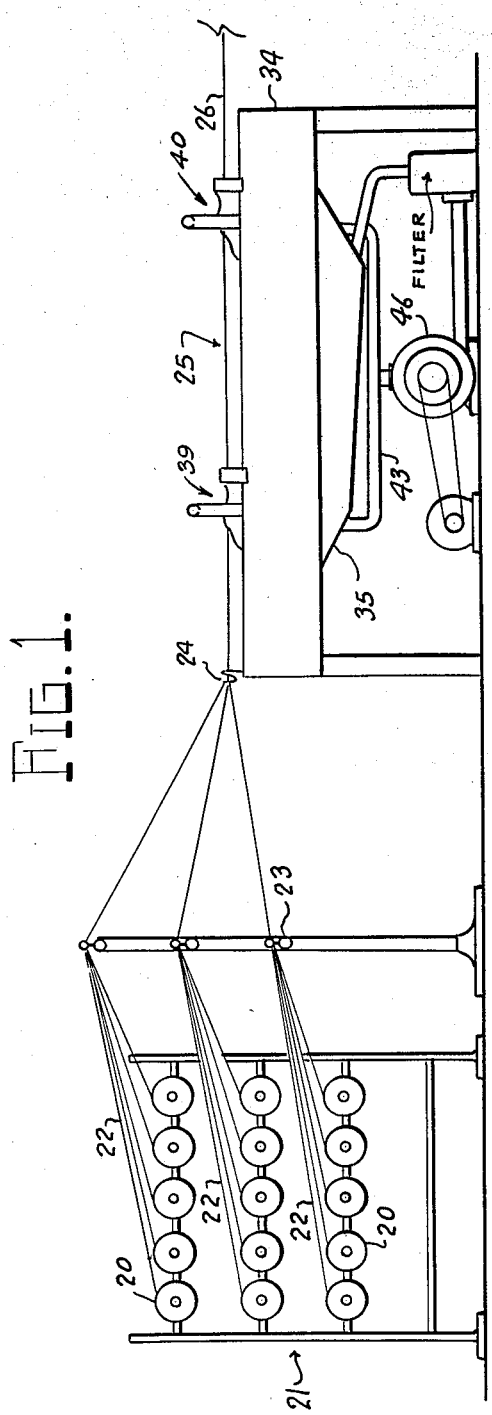
Fig. 1 is a simplified view in elevation of the left end of a production line designed to carry out the process of the invention for the production of a filamentary material embodying the invention.

In describing the process of the invention and the fabrication of a filamentary material embodying the invention it should first be pointed out that the strength, size, weight and precise proportions of glass fibers to resin by both size and weight are dependent upon the end use to which the finished product is to be put. For example, if the filamentary material is to be woven into an insect screen it need not have as high a tensile strength as a heavier filament designed for use, for example, in sealing around cables and pipes where they pass through the walls or bulkheads as in naval construction where material embodying the invention is employed as "Navy end sealing cord."

In fabricating a filamentary material according to the invention one or a plurality of spools 20 are assembled on a creel generally indicated at 21 so that strands 22 of glass fibers can be led through guides 23 and 24 to a coating machine generally indicated at 25. In the coating machine 25 each of the glass fiber strands 22 is combined with an exteriorly located jacket of resin and changes its characteristics, becoming a continuous filament 26 which is then led through a fusing oven generally indicated at 27 and to a winding machine 28. Each of the individual filaments 26 is separately wound in the machine 28 upon its own spool 29 at a constant lineal speed.

The winding machine 28 comprises a variable speed drive 30 for each of the spools 29, a reciprocating guide eye fragmentarily indicated at 31 which lays the filaments 26 on the spool 29, a pair of constant speed feeding wheels 32 and a speed control pulley 33. Tension in the filament 26 as it passes over the speed control pulley 33 raises or lowers the arm of the pulley 33 controlling the variable speed drive 30 to maintain the lineal speed of rotation of the spool 29 compensating for the increasing diameter of the spool of filament being wound and for any other changes in speed which might occur.

Figure 4:
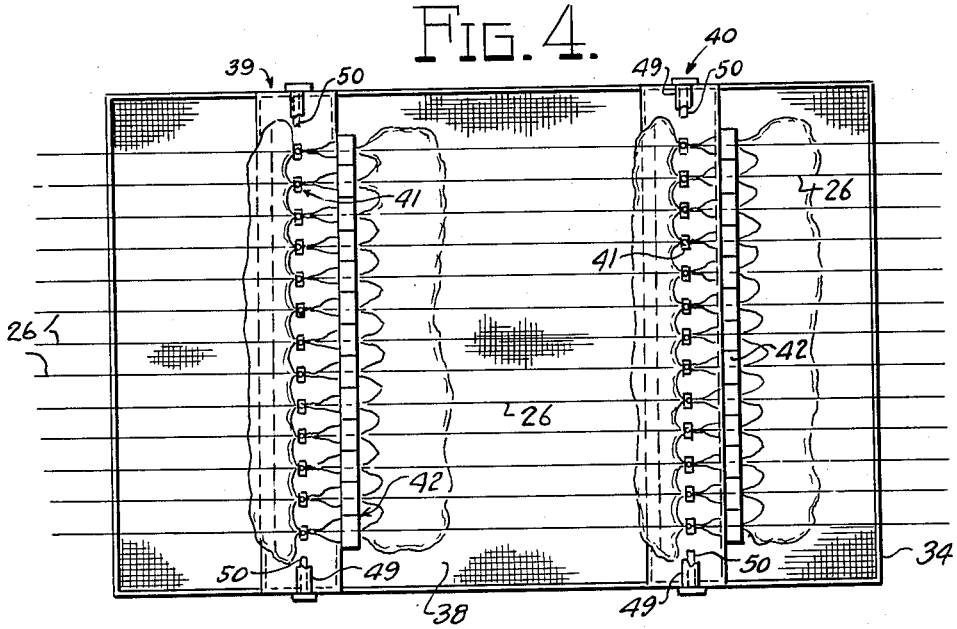
Fig. 4 is a plan view of the apparatus shown in Fig. 3.
Figure 3:
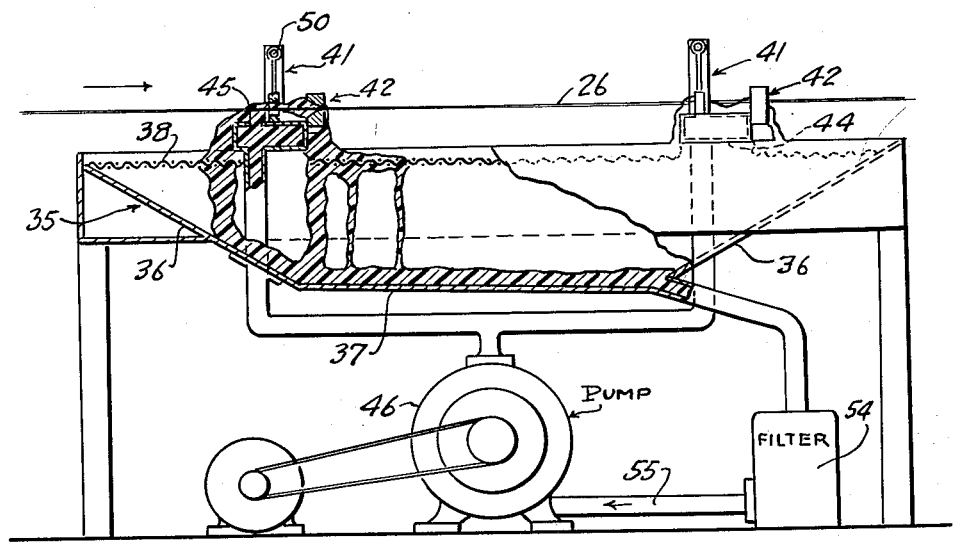
Fig. 3 is a vertical sectional view on an enlarged scale of one apparatus of the production line shown in Figs. 1 and 2.

Referring now more particularly to Figs. 3–9, each of the individual glass fiber strands 22 is individually combined with a suitable quantity of resinous material to form a single filament 26 according to the invention. The coating apparatus 25 comprises a table frame 34 (Fig. 3) supporting a trough 35 which has inclined ends 36 and a slightly inclined bottom 37. A screen 38 is stretched across the table 34 above the trough 35 and beneath a pair of transversely extending bridges 39 and 40.

Figure 2:
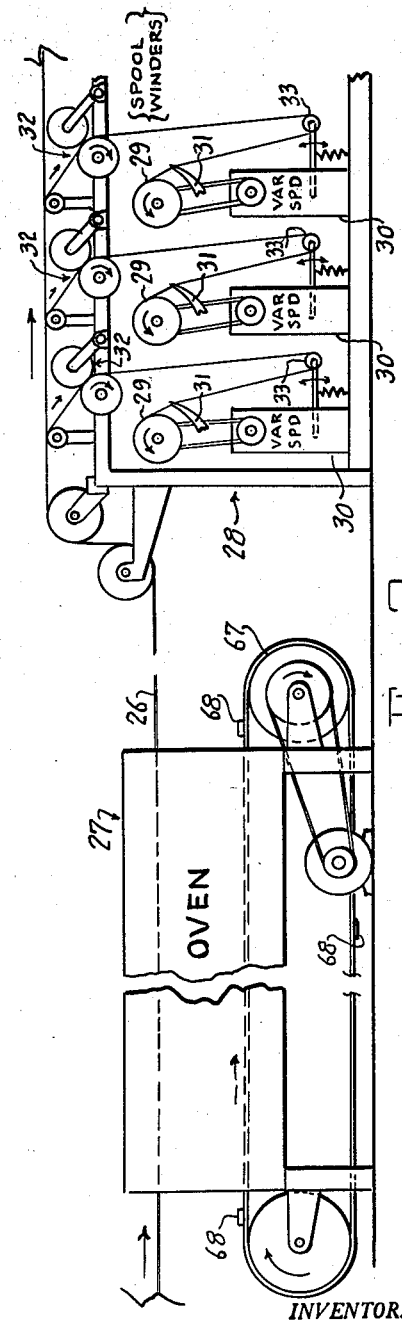
Fig. 2 is similarly a simplified view in elevation and showing apparatus constituting an extension of the production line illustrated in Fig. 1.

Each of the bridges 39 and 40 mounts a plurality of pairs of wipers 41 and dies 42. Each of the pairs of wipers 41 and dies 42 functions to combine its particular glass fiber strand 22 with an appropriate quantity of the resinous material to form one of the filaments 26 embodying the invention. While the structure of the coating apparatus 25 shown in Figs. 1–4 includes two sets of wipers 41 and dies 42, this is an expedient adopted in extremely high speed commercial production but is not essential for lower speed production or for the performance of the process embodying the invention. In the further description of the device, therefore, the explanation of the functioning of the wipers 41 and dies 42 will be limited to one pair.

The apparatus 25 has a resin flow system which comprises a branched inlet pipe 43 leading to a manifold 44 extending across the bridge 39 or 40 (see also Fig. 5) and which has an upwardly opening slot 45 in its upper surface, the slot 45 extending across in front of the laterally spaced series of wipers 41. Resinous material in a liquid state, as will hereafter be described, is circulated by a pump 46 upwardly through the inlet pipe 43 to the manifold 44 and out of the slot 45. The rate of feeding of the liquid resin carrier and its viscosity are selected and adjusted to be such that the material "oozes" upwardly above the top of the manifold 44 (see particularly Fig. 5) to a level such that it is engaged by each of the glass fiber strands 22.

As can be seen in Fig. 5 the strand 22 is led through the center of the wiper 41. Each of the wipers 41 consists of a generally oblong blade 47 mounted in an arm 48 which is supported from a sleeve 49 that is in turn pivotally mounted upon a rod 50 extending transversely across the machine 25 above its particular bridge 39 or 40. The sleeves 49 are longitudinally of sufficient size so that they maintain appropriate lateral spacing between the individual wipers 41. Because each of the sleeves 49 swings upon the rod 50 its wiper 41 can be swung upwardly out of the path of the particular strand 22 which normally passes through the blade 47 for cleaning or for threading a strand 22 of glass fibers through the device.

Each of the blades 47 has a vertically elongated slot 51 (see also Fig. 6) which has a lateral dimension, say twice the diameter of an individual glass fiber strand 22 and a vertical dimension which is a larger multiple in size. The particular dimensions of the slot 51 in the blade 47 are not critical, it being necessary only that the slot should be large enough to permit facile threading of a strand 22 therethrough and small enough to limit the quantity of resinous material flowing through the slot 51 freely.

It will be observed in Fig. 5 that the longitudinal movement of the strand 22 through the mass of resinous material entrains or draws along enough of the resinous material to produce a slight cavitation generally indicated at 52 on the left or leading side of the wiper 41. The volume of resinous material pumped upwardly through the slot 45 must be sufficiently high so that the slot 51 of the wiper 41 is maintained substantially full of resinous material when the strand 22 is passing therethrough at its production speed.

It will also be observed particularly in Fig. 5 that an excessive amount of resinous material is pulled through the slot 51 with the strand 22 so that a considerable quantity of material runs down the backside of the wiper 51 and thence spreads out on the upper surface of the manifold 44 finally flowing off the manifold 44 and running down through the screen 38 and into the trough 35. The resinous material runs down the bottom 37 of the trough 35 finally flowing by gravity into a drain pipe 53 (Figs. 1 and 3) which leads to a filter 54 and then from the filter 54 through a return line 55 which returns the material to the pump 46 for recirculation.

After the strand 22 passes through its wiper 41 it is led through the center of its forming die 42 (Fig. 5). Each of the dies 42 comprises a cup 56 and a center 57. The center 57 is cylindrical and has a flared axial bore 58 with its larger open end directed toward the wiper 41 for the reception of the strand 22. The bore 58 reduces progressively in diameter until at its exit side (Figs. 5 and 7) it has a diameter in the order of three times that of the particular strand 22 of glass fibers which passes therethrough. The presence of an excessive amount of resinous material entrained upon and being carried along with the strand 22 results in most of the material being forced backwardly off the strand 22 as the bore 58 reduces in diameter. Thus a considerable quantity of resinous material is backed up by the die 42 and streams downwardly onto and around the manifold 44 and bridge 39 flowing down through the screen 38 and into the trough 35.

It will be observed particularly in Fig. 5 that the cup 56 in which the die center 57 is mounted also is axially bored in line with the bore 58 of the center 57, its bore 59 being of slightly larger diameter than the exit diameter of the bore 58 and also being counterbored to diverge from the resin and glass filament 26 as it emerges from the bore 58. It will be seen that a trickle of resinous material, generally indicated at 60, flows down the exit side of the cup 56 indicating the passage through the die 42 of a quantity of resinous material slightly in excess of that necessary to provide the desired resinous outer layer on the filament 26.

The size of the filament 26 is determined by a combination of a number of considerations. These include, of course, the diameter of the particular glass fiber strand 22 constituting a part of the filament 26, its lineal speed of movement through the die 42, the diameter of the bore 58 at its exit side, the viscosity and surface tension of the resinous material applied to the strand 22 by the die 42, the temperature of the resinous material, and the degree of compressive force exerted upon the resinous material and the glass fiber strand 22 by the constricting bore 58.

In general, under the conditions and utilizing the material to be described below, if a glass fiber strand 22 constituting a part of a filament 26 being manufactured has a diameter of the value 1, the diameter of the exit end of the bore 58 should be 2 and the diameter of the finished filament 26 is approximately 1.5. It will be observed in Fig. 5 that as the filament 26 moves away from the die 42 the resinous material forms a tapered meniscus-like section generally indicated at 61, the precise shape of which results from the interplay of the factors enumerated above.

In this connection it may be observed that if the viscosity of the resinous material is too low or the die is oversize, the finished resinous material is not smooth and uniform but has a beaded appearance.

Referring now to Figs. 8 and 9 which consist of a full cross section and a fragmentary cross section, respectively, of the filament in Fig. 6, it will be seen that the glass fiber strand 22 consists of a plurality of individual associated glass fibers 62 between which, of course, fine interstices exist. The exterior layer of resinous material generally indicated at 63 in Figs. 8 and 9 is forced into these exterior interstices between the fibers 62, for example, into the space between fibers numbered 64 and 65 in Fig. 9 and similarly into the spaces between the fibers numbered 65 and 66 and 66 and 62.

The penetration of the resin 63 into the spaces between the individual fibers 62, 64, 65 and 66 produces what might be termed a "mechanical bond" between the resinous material and the glass fiber strand 22 to form the filament 26 of the invention. It has been experimentally determined that because of the impenetrable surface of glass fibers and of their nature as mono-filaments and probably because of their surface characteristics, resinous materials suitable for combination with a glass fiber strand 22 in the formation of a filament according to the invention do not "wet" the glass fibers and will not adhere to their surface as they would, for example, to the surface of porous substances such as natural fibers. Indeed, if a glass fiber strand is merely drawn through a mass of resinous material suitable for use in practicing the instant invention the resistance to passage of the glass through the material causes the material to move along with the glass fiber strand and thus apparently to be adhered thereto but upon removal of the strand from the material the strand is substantially clean and only small bits of resinous material may cling to the strand because of their surface tension or because of a small portion thereof having entered somewhere into the spaces between the individual fibers.

The practice of the process of the invention, therefore, includes a step of applying lateral force to the resinous material at the time of its formation around the glass fiber strand. The application of lateral force to the resinous material in accordance with the invention and when producing a filament on the apparatus shown in detail in Figs. 5–7, is done by the constricting bore 58 in the die center 57. Since the resinous material resists the passage of the glass fiber strand therethrough by internal friction, longitudinal force parallel to the glass fiber strand is applied to the mass of resinous material immediately surrounding the strand and the force is resolved by the walls of the bore 58 into inwardly directed force which squeezes the resinous material into the spaces between the fibers in the manner outlined.

In order to practice the invention as so far described for the production of filamentary material embodying the invention, we have found certain formulations of material and certain speeds of operation to be most desirable. These formulations and speeds are determined not only by the considerations already discussed with respect to relative sizes, etc., but also by the necessity for high speed production on an economical basis and the ability to properly fuse the resinous material on and to the glass fiber strand with which it is combined.

When the filament 26 leaves the coating apparatus 25 in the form shown in detail in Figs. 8 and 9, the condition of the resinous material 63 is virtually the same as when the material was first applied and during its circulation and recirculation in the machine, i. e., it is a viscous fluid. Its retention on the glass fiber strand 22 depends upon the "mechanical bond" already discussed and upon the surface tension of the material. It is, however, tacky and still fluid and, consequently, is of no utility. It is necessary, therefore, to fuse or suitably dry the glass fiber-resin filament 26 and for this purpose it with its fellows are led through a fusing oven generally indicated at 27 in Fig. 2. The operation of fusing or setting up or drying the filament is rendered far easier than would otherwise be possible because of the nature of the material being handled. The high tensile strength of glass fiber strands permits the oven 27 to be of substantial length, say, even 50 feet or more, and the strand can be drawn through the oven by mechanism located beyond the oven, i. e., the winding or packaging machine 28, so that nothing is brought into contact with the filament 26 between the time of its coating and its packaging in finished form. The tensile strength of the finished coated filament 26 and the tension applied thereto by the constant speed pulley 32 is high enough so that the lengths of filaments 26 extending through the oven 27 have no appreciable caternary. The oven 27 can be small in size without danger of contact between the filaments 26 and any portion of its interior.

Of course, due to unforeseen circumstances, one of the filaments 26 may break between its coating and its packaging and it may, therefore, be necessary to re-thread one of the filaments 26 through the oven 27 from time to time. Because of its small transverse dimensions and great length the operation of re-threading is not possible by merely passing the filament 26 through the oven 27. The oven 27 is provided with a re-threading belt generally indicated at 67 and having a plurality of slats 68 to which one end of a filament 26 can be tied or fixed and the belt driven to feed the filament 26 through the oven 27. When the apparatus is originally being placed in operation all of the filaments 26 may be secured to one of the slats 68 and fed simultaneously through the oven 27, tension created by the belt 67 being relied upon to feed the glass fiber strands 22 off their spools 20 and through the coating apparatus 25.

After the filaments 26 pass through the oven 27 they are led to the winding machine 28 passing around and over guide cylinders 69 and then individually being led down between their feeding wheels 32.

In discussing the formulations and sizes and weights of a filamentary material embodying the invention produced according to the process above described, it is first necessary to consider the end use to which the filamentary material is to be put. The filamentary material designed, for example, for use in weaving insect screening is fabricated from glass fiber strands denominated as 150—1/2. This indicates that each of the strands runs 15,000 yards to the pound and the material itself consists of 2 plys twisted together, each ply consisting of one of the strands. Therefore, in operation according to the invention, each of the spools 20 serving as a source for one of the strands 22 would be a spool of 150—1/2 strand. With this type of strand a suitable resinous material is a so-called plastisol (a dispersion) of polyvinyl chloride resin, for example, in the following formulation:

Polyvinylchloride resin, 100 parts
Dioctyl phthalate, 30 parts, plasticizer
Trioctyl phosphate, 20 parts, plasticizer
Dioctyl sebacate, 10 parts, plasticizer
Antimony trioxide, 5 parts, flame retarder
Mineral spirits, 3 parts, diluent
Barium-cadmium salts, 3.5, stabilizer A plastisol formulated as above has a viscosity in the order of 2000 to 4000 cps. It has a fusing temperature of 350° F. Therefore, the temperature to which the plastisol must be exposed to properly fuse the material is determined by the time of exposure and the temperature itself. Under the conditions explained, it has been found that insect screening filaments are properly prepared by pulling the filaments through an oven 32 feet long at 450 feet per minute with the oven temperature maintained at 425° F. This results in an exposure to heat of 4.25 seconds and properly fuses material of this size.

The preparation of suitable filamentary material for other end uses involves a determination of the size and strength of the glass component and the quantity of resinous material to be combined therewith to produce a filament having the desired characteristics. As a further example the production of a heavy wrapping or tying cord such as a Navy end sealing cord or a wrapping or braiding cord for use, for instance, in fire hoses, begins with a strand denominated as a 150—4/5 wherein the individual strands running 15,000 yards to the pound are combined in groups of four, and five of these groups or plys are twisted together, the finished multiply yarn or strand forming a component of one filament prepared according to the invention. The peculiar and desirable characteristics of the filamentary material of the invention are found to be most desirable when the weight ratio of glass to resin is approximately 1:1.

Other end uses of filamentary material produced according to the invention and types of strand materials from which they are produced are tabulated below:

Automobile seat cover fabrics, 150—1/0 woven
Tape for outdoor furniture, 150—1/2 woven
Marquisette window curtains, 900—1/2 woven
Drapery fabrics, 450—1/2 woven The last mentioned item, i. e., drapery fabrics, illustrates the flexibility of the filamentary material embodying the invention since the fabric pattern may be produced by weaving filaments of different colors or filaments of a single color may be woven to form a fabric and then the pattern may be printed. Dyes for coloring vinyl resins are well known in the art and since the exterior of the filamentary material of the invention is vinyl resin the printing and dye problem is very simple.

A further widespread usage for filamentary material of the invention is in the reinforcement of plastic structures such as awnings or so-called "radomes" and other structures where it has been difficult to achieve satisfactory bonding between the resinous mass and the reinforcing fibers. Utilization of the filamentary material of the invention with its mechanical bond between the glass and the resin components permits a simple bond between the resin component and the resin of the reinforced mass.

Experimentation in the production of fine filamentary materials according to the invention reveals that fine marquisette curtains can be produced as mentioned above by weaving filaments as fine as the 900—1/2 or even 900—1/0. The finished diameter of this last filamentary material is less than .003" and consists of the single glass fiber strand running 90,000 yards to the pound with the same weight of resin. Thus the finished filament runs 45,000 yards to the pound and with a diameter of .003" produces a very fine fabric having a high sheen.

The formulation mentioned above and the materials such as plasticizers, flame retarders, diluents and stabilizers are not intended as limitations on the material of the invention because all of these substances in the illustrative formulation are well known in the art and the numbers of other materials suitable for use is enormous. The process of the invention is rather concerned with the problem of achieving a sound and long-lasting bond between the glass and resin components of the filamentary material.

In further explanation of the utility and advantages of the filamentary material embodying the invention, Figs. 10 and 11 illustrate a fragment of insect screening woven from the material and a fragmentary cross section of an intersection of two filaments embodying the invention. In Fig. 10 a selvedge edge generally indicated at 70 of a fragment of insect screen 71 is shown as being formed from two double warp threads 72 and 73 through which cross threads or woof filaments 74 are woven. By reason of the characteristics of the filamentary material of the invention insect screening as shown in Fig. 10 can be woven on the same weaving machinery designed for and formerly employed with metal wires. The filamentary material of the invention however has distinct advantages over metallic material for insect screening, some of which have been earlier mentioned and one of which is illustrated in Fig. 11.

In Fig. 11 warp thread 75 is shown as crossing over one of the woofs or cross threads 74. After the screen 71 is woven the points of crossing of the warp and woof threads are under considerable tension since the weaving machinery draws the threads tight and because the filaments do not stretch any appreciable amount during or after the weaving. The woven screen can thus be passed through an oven or beneath a battery of heating lamps to raise the temperature sufficient so that the resinous material softens slightly. Pressure created by the tension on both the warp and the woof causes the slightly softened resinous material to flow, fusing the warp and woof threads together at their points of intersection and forming minute fillets, for example, as indicated at 76 in Fig. 11.

This adhesion of the warp and woof threads to each other is highly advantageous in screening material since it transfers strains to which one or two of the warp or woof threads might be subjected to a substantial number of the threads and thus insect screening with the cross threads adhered to each other is stronger and resists penetration to a higher degree.

A similar result can be achieved by treating the woven screening with an appropriate solvent which softens the exterior of the filaments whereupon the contacting cross filaments are adhered by the pressure against each other caused by the tension with which they are woven.

While any screening material woven from part or all plastic filamentary material would have the property of adhesion between the cross threads if it were treated as outlined, insect screening woven from the material of the invention has additional properties not available from mere plastic screening. As mentioned earlier the material of the invention is not easily deformable and although it will stretch (in the order of less than 3%) it is highly resilient so that it restores itself to its normal size and thus sags do not develop in screening fabricated in the manner explained. Furthermore, although the exterior portion of a filament of the invention is fusible, the material as a whole will not support combustion and it cannot be melted away in any area by contact with fire. Even if the resinous exterior is melted the glass fiber interior is flameproof and retains its strength so that breaks and holes do not develop in insect screening fabricated therefrom upon contact with hot objects.

Figs. 12 and 13 illustrate a modified form of apparatus on which the practice of the instant invention may be expeditiously carried out where a smaller production is desired at a lower speed. In Fig. 12 there is shown a coating apparatus comprising a pan 77 containing a quantity of a suitable resinous composition generally indicated at 78, for example, a plastisol formulated as above disclosed or with different known ingredients. A feeding drum 79 extends across the pan 77 dipping at the bottom into the resinous material 78. The drum 79 is rotated (in a clockwise direction) and elevates a layer of resinous composition upwardly spilling it over onto the lower end of a slightly inclined guide 80. Clearance between the edge of the guide 80 and the surface of the drum 79 at 81 is provided but most of the resinous material on the surface of the drum passes onto the lower end of the guide 80. A guard 82 extends over the top of the drum 79.

A plurality of glass fiber strands 84 are led through suitable guide eyes 83 and over the guard 82. They pass along above the guide 80 and finally enter the mass of resinous composition moving up the guide 80 under the influence of the new material being fed onto the guide 80 from the drum 79, just in front of a plurality of wipers generally indicated at 85 which are similar to the wipers 41 of Figs. 5 and 6. For each of the wipers 85 a die 86 is provided which is similar to the dies 42 of Figs. 5 and 7 and each of the strands 84 is led through its corresponding die 86.

A section of screen 87 extends beneath the wipers 85 and dies 86 and overflow of resinous material from the wipers 85 and dies 86 passes downwardly through the screen 87 in returning to the bottom of the pan 77.

It should be observed that in the apparatuses of both Figs. 1–4 and 12 a screen is interposed between the overflow from the wipers 41 and 85 and dies 42 and 86 and the recirculation mass of resinous material. It has been found that in operation a small amount of "fuzz" is removed from the glass fiber strands during their passage through the resinous material and through the wipers and dies. This fuzz is entrained in the flowing excess of resinous material and preferably should be removed therefrom before the material is returned for subsequent combination with the glass fiber strands. The majority of the fuzzy material can be removed by merely passing the resinous substance through a relatively fine screen but where high production is desirable so that the strands are pulled at a high rate of speed, it is preferable also to add a filter such as the filter 54 in the recirculation system so that virtually all of the fine "fuzz" of broken glass fibers is removed from the resinous material. Otherwise the "fuzz" increases the viscosity of the plastisol and may even clog the dies, or, by arching away from the filament, serve as a support for a "flag" of resin on the exterior of the filament.

Figs. 14, 15 and 17, 18 illustrate further modifications in apparatus suitable for use in practicing the invention. In these forms of apparatus the compressive force required to squeeze the resinous material into the interstices between the fibers making up the glass fiber strand is created by tightly bending the glass fiber strands, after they are preliminarily coated with resinous material, around a series of closely spaced smooth surfaced rods. In the apparatus of Figs. 14 and 15 a plurality of glass fiber strands 88 is fed into a mass of resinous material flowing up an inclined plate 89 in the manner described with respect to Figs. 12 and 13. The friction between the moving strand and the resinous substance entrains a quantity of the substance with the strands which are then led over a horizontally extending rod 90, beneath a spaced parallel rod 91 and over a third parallel rod 92. The rods 90, 91 and 92 are of relatively small diameter, say, one-quarter inch and are spaced on relatively close centers, say one inch. The strands with their accompanying supply of resin are bent rather tightly around the rods 90, 91 and 92 so that resin between the surfaces of the rods and the arcuate surface of the glass fiber strand adjacent thereto is squeezed between the two surfaces. Again there is substantial penetration of resin into the interstices between the glass fibers making up the strands 88 and the surface tension of the resinous material smooths out an exterior layer mechanically bonded to the inner glass fiber strand. An excessive amount of resinous substance is deliberately permitted to adhere to the glass fiber strands after leaving the squeezing rods 90, 91 and 92 and each of the coated filaments 93 so produced is led between a pair of wipers 94 (Fig. 15) which are so spaced as to wipe off the excess of resinous material leaving only sufficient resinous material to provide an exterior layer of the desired thickness uniformly spread around over the inner glass fiber strand and retained thereon by the mentioned mechanical bonding.

In Figs. 16 and 17 a slight modification of the apparatus of Figs. 14 and 15 is disclosed in which glass fiber strands 95 are led into a pan 96 and downwardly into a pool of resinous material 97 maintained therein. Guide rods 98 may be employed to hold the strands beneath the surface of the resinous material 97. The strands are led around and between three spaced staggered pins 99 functionally identical with the rods 90, 91 and 92 of Fig. 14 and of similar size and spacing. In this instance the presence of the pans beneath the surface of the resinous mass provides an excessive quantity of resinous material for squeezing into the interfiber interstices of the glass fiber strands. Again, when the coated filaments 100 are led upwardly out of the resinous material they may be carried between wiper blades generally shown at 101 for the removal of excess resinous material.

Fig. 18 illustrates a simplified apparatus for the practice of the instant invention for the production of a single filament 102 according to the invention. In this apparatus a glass fiber strand 103 is led inwardly into a tube 104 through a die member 105 similar to the die center 57 of Fig. 5 which is mounted at the entering end of the tube 104 with its flared bore 106 opening outwardly. A supply of suitable resinous material is maintained in the tube 104 from a supply tank 107 connected thereto, the material being allowed to flow downwardly through the tank 107 through a feeding pipe 108 and to the tube 104 by gravity.

A forming die 109 which may be identical with the die 105 and turned in the same direction, closes the exit end of the tube 104 and the glass fiber strand 103 passes out of the tube 104 through the die 109, being combined with an appropriate quantity of resinous material by the die 109 to form the finished filament 102.

We claim:

A method for making an open mesh glass fiber material suitable for screening and the like, and having precoated temperature and moisture resistant thermoplastic coated glass fiber elements, said method comprising weaving said elements into an open mesh fabric of spaced warp and spaced weft strands with the strands thereof in surface contact at their points of intersection, moving said fabric continuously through a zone having a temperature sufficiently high and at a rate sufficiently slow, for fusing said thermoplastic coatings for fusing the coating of said warpg and weft strands to each other at their points of intersection for securing said strands together at such points.

References Cited in the file of this patent

UNITED STATES PATENTS

| | | |
|---|---|---|
| 2,133,238 | Slayter et al. | Oct. 11, 1938 |
| 2,333,618 | Strauss | Nov. 2, 1943 |
| 2,334,754 | Dreyfus | Nov. 23, 1943 |
| 2,344,494 | Camp | Mar. 21, 1944 |
| 2,360,245 | McFarlane | Oct. 10, 1944 |
| 2,369,876 | Warren | Feb. 20, 1945 |
| 2,386,818 | Seavey | Oct. 16, 1945 |
| 2,533,439 | Elder | Dec. 12, 1950 |
| 2,594,521 | Tingley | Apr. 29, 1952 |
| 2,647,296 | Shive | Aug. 4, 1953 |
| 2,769,222 | Southwell | Nov. 6, 1956 |
| 2,771,659 | Ball | Nov. 27, 1956 |

FOREIGN PATENTS

| | | |
|---|---|---|
| 549,255 | Great Britain | Nov. 12, 1942 |